Nov. 5, 1940. M. SCHOTTENFELS Re. 21,619

CONNECTOR DEVICE

Original Filed April 29, 1935

INVENTOR.
Monroe Schottenfels
BY C. P. Goepel.
his ATTORNEY.

Reissued Nov. 5, 1940 Re. 21,619

UNITED STATES PATENT OFFICE 21,619

CONNECTOR DEVICE

Monroe Schottenfels, New York, N. Y.

Original No. 2,040,958, dated May 19, 1936, Serial No. 18,771, April 29, 1935. Application for reissue July 20, 1940, Serial No. 347,780

6 Claims. (Cl. 24—198)

This invention relates to connector devices, more particularly, though not exclusively, intended for connecting parts of garters, brassières and other equipment or accessories of wearing apparel, the object in the case of garters, brassières and the like, being to provide a simple and readily applied link coupling wherewith to join strips of tape, ribbon, elastic and the like, which are customarily used in connection with such articles to fasten them in place upon the person of the wearer.

An object of the invention is to provide an improved connector of the character described, made of metal, Celluloid, or other suitable coupling material adapted, when applied, to lie flatwise against the person of the wearer and to hold the connected strips in flatwise relation against the person of the wearer.

Another object of the invention is to provide a connector of the character described having at least one open eye for the ready attachment and detachment of at least one loop-like strip, and further to provide on the connector in association with the open eye, constructional means in the form of a novel cooperative arrangement of nodes and a hook for preventing accidental escape of an applied strip from such open eye.

The foregoing and other novel features and arrangement which I have in contemplation by the invention will be better understood from the following description taken in connection with the accompanying drawing, in which for purposes of illustration, I show two practical examples of the invention, and in which.

Figure 1:
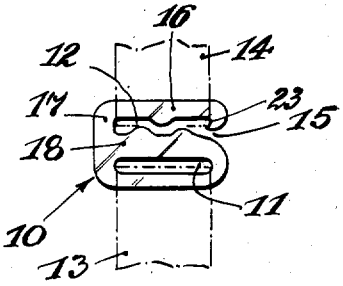
Figure 1 is a plan view of a connector device made in accordance with my invention, showing in dash-dot lines fragments of strips engaged with the eyes of the device.

Referring now in detail to the accompanying drawing, and first to the form of construction illustrated in Figs. 1 to 4 inclusive, 10 denotes a link coupling produced in accordance with my invention and having formed therein elongated substantially parallel eyes 11 and 12 for accommodating the strips of ribbon, elastic or the like 13 and 14, respectively, so that such strips, when the coupling is in use against the body of the wearer, will be maintained flatwise against the body of the wearer and prevented from rolling or twisting upon themselves. The link coupling may be produced from sheet metal, sheet Celluloid or the like. It may also be produced from rubber.

In the present embodiment, the eye 11 is represented as closed, while the eye 12 is of the open character, having in open communication therewith an entrance throat or passageway 15 which is in general disposed at an angle to the longitudinal plane of the eye. This elongated eye 12 with its entrance throat 15 adjacent one end thereof, is in the construction shown, produced by providing an elongated arm 16 one end 17 whereof is integral with the body 18 of the coupling. The longitudinal edges or walls 19 and 20 of the arm and body respectively, which edges constitute in general the opposite longitudinal sides of the eye 12, are substantially parallel. The arm 16 is formed at its free end with a hook 21 having an inwardly jutting portion 22. The inner face of the hook 21 is formed with a recess 23 above the jutting portion 22, and this recessed face constitutes the end wall for the eye.

According to an important feature of my improvements, the hook 21 and adjacent portion 24 of the body are shaped to produce between them the inclined entrance throat or passageway 15 through which the strip is passed transversely either for engagement with the eye or for removal therefrom. The entrance throat 15 communicates with the eye between the inwardly jutting portion 22 and a node or protuberance 25 which projects laterally into the eye from the edge or wall 20 of the body. The inwardly jutting portion 22 and the tip of the node constitute points of support for a strip as 14 when the latter is properly applied in the eye.

Figure 3:
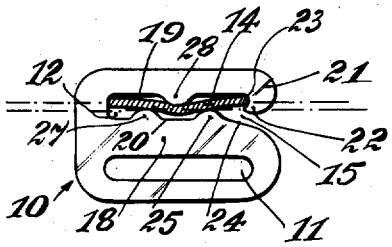
Fig. 3 is a plan view on a larger scale, illustrating how a strip engaged in the open eye is retained therein by the hook and nodes against accidental escape, the strip being shown in cross section.
Figure 2:
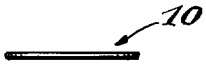
Fig. 2 is an edge view of the device.
Figure 4:
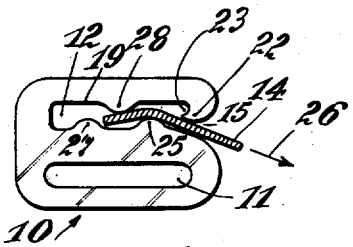
Fig. 4 is a similar view, but showing the strip in process of removal from the open eye.

As best shown in Fig. 3, in this connection, it is to be noted that the jutting portion 22 and the tip of the node 25 are in a common plane which lies between the planes of the longitudinal edges or walls 19 and 20. When, as best illustrated in Fig. 3, a strip as 14 is engaged in the eye so as to cover the entrance throat 15, having support at one side thereof upon the node 25 and at the other side thereof within the recess 23 and upon the jutting poriton 22, such strip will be maintained against accidental escape from the eye through the throat 15. However, the strip may be readily detached by hand, merely by pressing the longitudinal edge of the strip across the jutting portion and into the entrance throat through which the strip may be withdrawn laterally outwardly as indicated by the arrow 26 in Fig. 4.

Other nodes as 27 and 28 may be provided as additional safeguards against accidental escape of the strip through the entrance throat. The node 27 projects into the eye from the body at a distance from the node 25 and its tip lies in a plane common to the tip of the node 25 and the jutting portion 22. The node 28 projects inwardly into the eye from the arm 16 and at a position in which it comes substantially midway between the positions of the nodes 27 and 25. In this arrangement, the node 28 engages one side of the strip at a point substantially midway between the two points at which the nodes 25 and 27 engage with the opposite side of the strip. Under this triangular arrangement of the nodes, the strip is maintained in the eye with the opposite portions thereof inclined toward the arm, and this means that the portion of the strip which covers the entrance throat is maintained in the recess 23 above the jutting portion 22. This arrangement of parts is a simple and effective one for preventing the escape of the applied strip through the entrance throat and by this arrangement increased firmness and stability are given to the strip within the eye, but nevertheless permitting longitudinal sliding movement of the strip within the eye.

Figure 5:
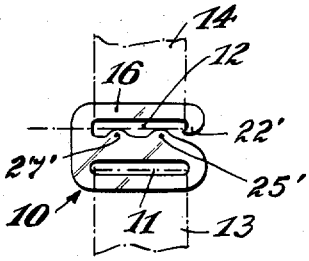
Fig. 5 is a view similar to Fig. 1, but showing another form of the connector device.

In the form of construction illustrated in Fig. 5, the jutting portion 22', node 25' and node 27' are counterparts respectively of the jutting portion 22, node 25 and node 27 illustrated in Figs. 1 to 4. In the form of construction shown in Fig. 5, however, it will be noted that there is no node projecting into the eye from the arm and that in consequence of this, the applied strip lies transversely flat, being supported upon the body side of the eye upon the nodes and upon the inwardly jutting point.

Figure 6:
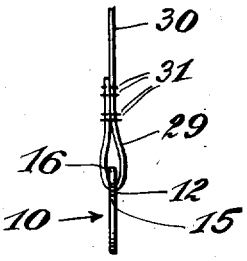
Figs. 6 and 7 are edge views, showing in engagement with the connector, strips or ribbons having different styles of loops.
Figure 7:
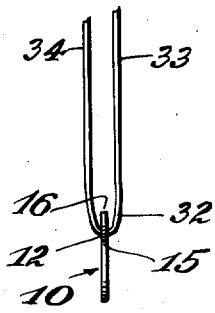

In Figs. 6 and 7, I illustrate by way of example different types of loops which may be engaged with the eyes of the link coupling. In Fig. 6 the loop 29 formed on the end of a strip 30 is represented as engaged with the open eye of the coupling. The loop 29 comprises an end loop for the purpose which is folded upon itself and secured permanently in place by stitches 31. This permanent loop 29 may be applied to or removed from the arm 16 by passing it through the open throat leading to the eye. In Fig. 7, the strip of material is bent upon itself to form a loop 32 adapted to be engaged with or disengaged from the arm 16 by passing it through the entrance throat in communication with the eye, the two sides or legs 33 and 34 of this loop each being adapted to be attached at its free end to a garment or the like.

The terms and expressions employed are used as terms of description and not of limitation, and I have no intention in the use of such terms and expressions, of excluding any mechanical equivalents of the special features shown and described, or portions thereof, or arrangement thereof, but recognize that various changes in the construction of the parts are possible within the scope of the invention as claimed.

I claim:

1. A link coupling comprising a body and an arm having substantially parallel walls defining an elongated eye, a hook on the arm forming one end of the eye and also forming with the body an inclined entrance throat at one end of the eye, said hook having at the end of the eye a jutting portion lying in a plane between the planes of the substantially parallel walls, and nodes projecting into the eye, the free tips of which lie substantially in the plane of the jutting portion of the hook, said nodes projecting a distance between themselves from the body.

2. A link coupling comprising a body and an arm having substantially parallel walls defining an elongated eye, a hook on the arm forming one end of the eye and also forming with the body an inclined entrance throat at one end of the eye, said hook having at the end of the eye a jutting portion lying in a plane between the planes of the substantially parallel walls, and nodes projecting into the eye the free tips of which lie substantially in the plane of the jutting portion of the hook, said nodes projecting from the said substantially parallel walls in alternate positions so as to have within the eye a distance between themselves.

3. The combination with a link coupling, a portion of which is formed with an elongated eye wherein to apply a connecting strip, said eye having adjacent one end thereof a communicating opening through which to pass the strip for its application and removal, of a guard in the form of a hook disposed at one side of said opening, and nodes on the coupling projecting into the eye from opposite sides thereof and at a distance between themselves for engaging opposite sides of an applied strip so as to cause a portion thereof to be inclined across said opening and terminate behind said hook.

4. A connector device comprising a flat plate having a transverse closed strap receiving slot near one end and having a second transverse loop receiving slot near its opposite end opening through one edge of the plate for the lateral edgewise reception of a strap, said plate having at the marginal edges of the second slot offset series of projections with a projection from an edge disposed at the entrance of the slot and with the remaining projections disposed in staggered relation to provide a series of barriers for holding the strap from tilting in the slot and accidental removal therefrom.

5. A link coupling comprising a body portion and an elongated arm portion with an elongated eye open at one end and between said body and arm portions, said arm portion having a hooked portion at one end contiguous said open end of the elongated eye and nodes projecting into said eye intermediate the ends thereof, nodes on said body portion projecting into said eye at points substantially antinodular as to the nodes on said arm and in spaced apart relation, said elongated eye adapted to receive a strap and in conjunction with said nodes and hooked portion to secure the strap against lateral motion.

6. In a link coupling, a plate body having walls spaced apart to form a transverse loop-receiving eye closed at each of its horizontal ends by said walls, said plate body having an entrance throat disposed at an angle to the longitudinal eye, said entrance throat forming an arm on said plate body, said arm being formed at its free end with a hook having an inwardly jutting portion adjacent one side of the throat, and a curved recess constituting an end wall of the eye merging at one end with the inner wall of the arm, and at its other end at the peak of the jutting position and forming a continuous inner wall for said arm, and nodes connected to said walls intermediate the length thereof, extending into said eye and having their extremities in spaced apart relation within the eye, said walls in conjunction with said nodes and curved hooked portion being adapted to secure the strap in the eye against accidental removal therefrom, at least one of said nodes being at one side of the entrance throat.

MONROE SCHOTTENFELS.